United States Patent [19]

Michalski et al.

[11] 4,170,753

[45] Oct. 9, 1979

[54] DIAGNOSTIC EQUIPMENT FOR THE INTERNAL COMBUSTION, CARBURETOR TYPE ENGINES

[75] Inventors: Stanislaw Michalski; Marian Fabrycy, both of Warsaw, Poland

[73] Assignee: Przemyslowy Instytut Automatyki i Pomiarow "MERA-PIAP, Warsaw, Poland

[21] Appl. No.: 922,584

[22] Filed: Jul. 6, 1978

Related U.S. Application Data

[63] Continuation of Ser. No. 770,317, Feb. 18, 1977, abandoned.

[30] Foreign Application Priority Data

Feb. 27, 1976 [PL] Poland .................................. 187568

[51] Int. Cl.[2] .............................................. F02P 17/00
[52] U.S. Cl. .................................................. 324/384
[58] Field of Search .............................. 324/16 R, 15

[56] References Cited

U.S. PATENT DOCUMENTS

| | | | |
|---|---|---|---|
| 3,693,073 | 9/1972 | Colette | 324/16 R |
| 3,955,135 | 5/1976 | Fastaia | 324/16 R |
| 3,956,691 | 5/1976 | Hryhorczuk | 324/15 |
| 3,961,239 | 6/1976 | Lach | 324/15 |
| 4,006,403 | 2/1977 | Olsen et al. | 324/16 R X |

Primary Examiner—Stanley T. Krawczewicz
Attorney, Agent, or Firm—Haseltine, Lake & Waters

[57] ABSTRACT

Equipment for diagnosis of internal combustion, carburetor type engines, comprising a meter, a probe introduced in the engine 1-st cylinder high voltage circuit, a stroboscope complete with trigger, as well as resistors, rheostats and capacitors connected to a change-over switch to select the desired type of duty, which with the selector switch in specific operating position, make the circuits for checking various operating variable parameters of the engine under the test.

4 Claims, 1 Drawing Figure

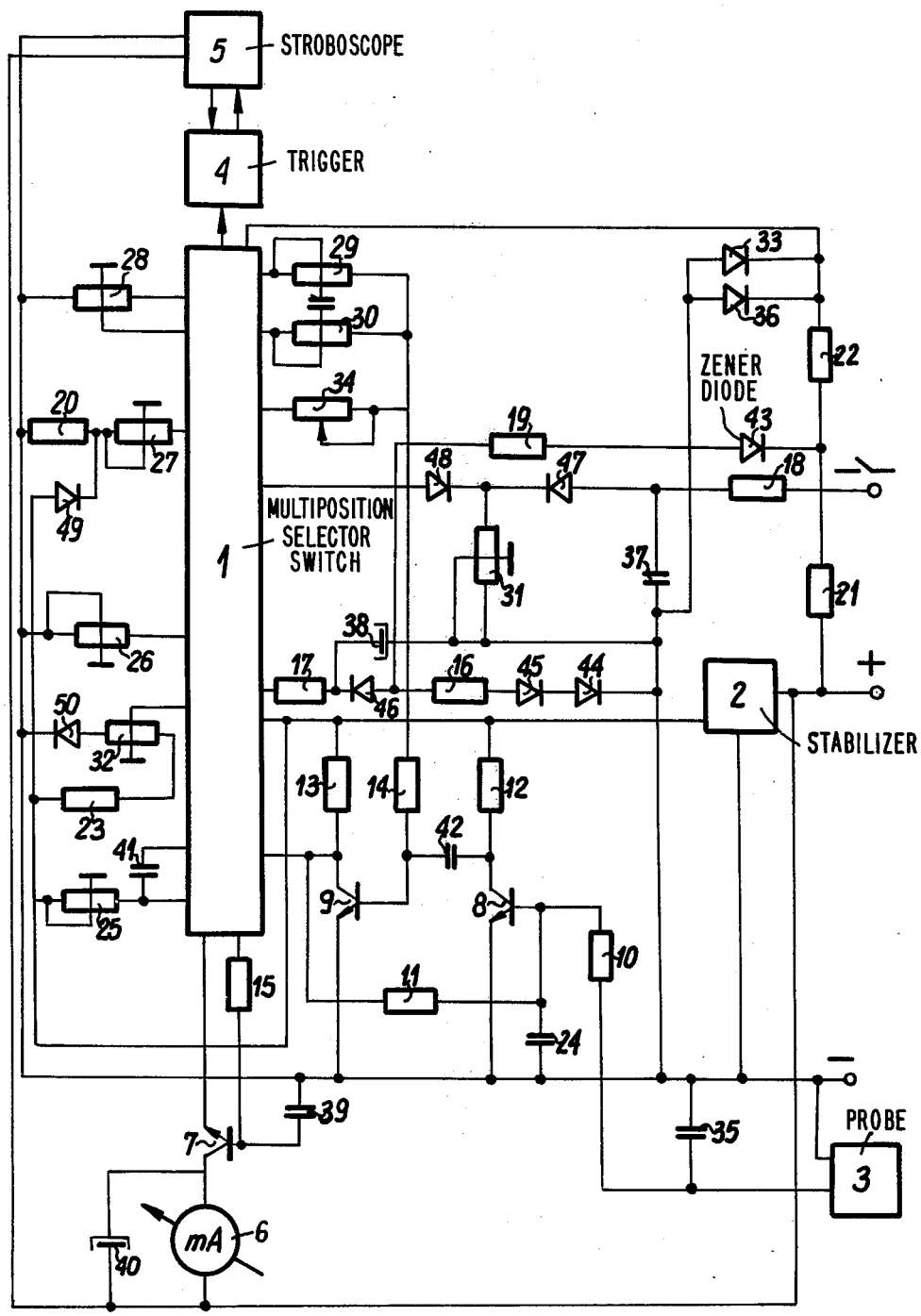

DIAGNOSTIC EQUIPMENT FOR THE INTERNAL COMBUSTION, CARBURETOR TYPE ENGINES

This is a continuation of application Ser. No. 770,317 filed Feb. 18, 1977, now abandoned.

FIELD OF THE INVENTION

The invention relates to diagnostic equipment for internal combustion, carburettor type engines, to be used for quick checking and adjustments of the engine operating variables.

PRIOR ART

The existing diagnoscopes are provided with several individual measuring circuits, each being intended for checking one specific parameter only, such as the contact-breaker closing angle or the ignition advance angle, whereby any of those circuits is terminated with its own meter. Such designs, however, are expensive and not economical because of the large sizes involved and the considerable number of indispensable interconnections to the engine under the test.

Known are other testers viz. for checking single parameters, such as those of the Hoffman Co. /German Federal Republic/ manufacture, or with some minor grouping of variables to be tested, but their efficiency is rather low due to the necessity for frequent changeover of a number of the sensors employed. Moreover, a manual tester /diagnoscope/ is available, which renders the possibility for measuring the five various parameters of the engine. As a rule, such measurements of impulse- or continuous parameters usually are to be carried out in separate measuring circuits with their voltage outputs brought out to a common meter. Therefore, the measurement linearity varies, while the provision of separate graduations for each parameter is rather impossible because of the limited size of the meter, thus causing measuring error increase. Another disadvantage of such a design lies in its sophisticated electronics caused by the separation of the measuring circuits.

SUMMARY OF THE INVENTION

This invention seeks the development of simple equipment intended for internal combustion engine diagnosis purposes, and to make it possible to measure I.C. Engine various operating variables, such as contact-breaker closing angle, ignition advance angle, battery charging voltage, high voltage level across the contact-breaker's capacitor, condition of the breaker contact surface or the engine rotational speed, in such a manner as to ensure identical linearity, all the variable values being indicated on common meter with a single scale graduation.

This object has been achieved by the apparatus of the invention, which comprises the following: the probe included in a high voltage circuit of the engine 1-st cylinder; a stroboscope complete with trigger, and a multithrow switch to select the required type of duty. The meter is introduced into the collector circuit of the transistor, its emitter being associated with the said selector of the duty. The latter is also connected—via the resistor—to the transistor base, and to the monostable element output, the peak voltage testing circuit resistor, the rheostats to preset the values of the variables under the test, the coupling resistor for the engine contact-breaker, the stroboscope triggers and the stabilizer, which in subsequent positions of the selector switch, form the circuits for measuring specific parameters /variables/.

With the equipment of the invention, measuring of the five basic operating parameters of the engine become possible, identical linearity being ensured for all the parameters under test due to the current-type control of the meter. Changing of the parameter to be tested, will be effected merely by resetting the duty selector switch, with no need to rearrange the engine connections. Thus, servicing of the equipment becomes very simple, and the time required for the engine adjustment can be substantially reduced, as compared to other existing devices.

BRIEF DESCRIPTION OF THE DRAWINGS

The sole FIGURE of the invention is a circuit diagram of one embodiment of diagnostic apparatus according to the invention.

DETAILED DESCRIPTION

The equipment meter 6 with its shunt capacitor 40, is associated—via the transistor 7—with a multithrow switch 1 to select the required type of duty, whereby the transistor 7 base is connected to the switch 1 via the resistor 15, the switch 1 being of conventional construction and can be constructed as disclosed in Polish Pat. No. 87951. The switch 1 is also connected to the output of the monostable element consisting of two transistors 3 and 9, whereby a probe 3 introduced into the high voltage circuit of the first cylinder of the engine, is included—through the integrator consisting of the resistor 10 and the capacitors 35 and 24—within the transistor 8 base loop. Further, the selector switch 1 is connected to resistor 17, which,—together with the series diode 46, the resistor 16, as well as the diodes 44 and 45—forms a circuit for testing peak voltage. The junction between the resistor 17 and the diode 46 is connected—via the capacitor 38 and the rheostat 31—to the common junction of push-pull diodes 47 and 48, the diode 48 being connected to the selector switch 1, while the diode 47—via the resistor 18—is connected to the contact-breaker of the engine under the test.

The junction between the diode 46 and the resistor 16, is connected—through the resistor 19—to the Zener diode 43. The selector switch 1 is also connected to a voltage limiting circuit comprising the diodes 33 and 36 as well as the resistor 21, and also to the trigger 4 of the stroboscope 5 and the stabilizer 2. Moreover, the selector switch 1 is connected to the rheostats 25, 26, 27, 28, 29, 30 and 34, which according to the selector switch operating position, and together with the above mentioned components, complete the relevant circuits for measuring the engine specific operating variable values.

With the selector switch 1 set for testing the ignition advance angle, a signal from the probe 3, integrated in the integrator circuit, will actuate the monostable element, which comprises the transistors 8 and 9, the resistors 11, 12, 13 and 14, the rheostat 34 and the capacitor 42. The probe 3 is a conventional voltage step-up transformer readily available in the market place. The rheostat 34 is connected to a stabilizer 2 of conventional construction readily available in the market place, and the rheostat 34 constitutes—together with the capacitor 42—a phase splitter, the capacitor 41 being connected to the trigger 4 of stroboscope 5 the stroboscope 5 and its trigger 4 are common elements which are readily available and are described in "Stroboskopy" by J. Rutkowski, Wydawnictoso Nankowo Techniczne 1961.

The capacitor is connected to the resistor 15 and the base of transistor 7, the emitter of the latter being connected to the rheostat 25, across which the positive pulse current results in voltage drop corresponding to the base potential of transistor 7. Current flow through the transistor 7, and thus through the meter 6, is indicative of the width of the pulse of the phase shift as preset with the rheostat 34 in the case when the stroboscopic effect has been obtained upon conformance of the engine adjustment marks. With the selector switch 1 set to measure the engine speed, the circuit performance is similar, except that the capacitor 41 is not connected now to the trigger 4, nor the rheostat 34 to the stabilizer 2.

On the other hand, the stabilizer 2 is connected to the rheostat 29 or 30, according to the measuring range. Current flow through the meter 6 will represent the engine rotational speed /i.e. the number of revolutions per min./ The capacitor 39 at the transistor 7 base serves to ensure interference immunity.

With the selector switch 1 set to measure the battery charging voltage, the resistor 15 remains connected to the rheostat 28, and the transistor 7 emitter to the rheostat 27. The higher the supply voltage, and thus the battery charging voltage, the higher the potential applied to the transistor 7 base to force a proportional current through the resistor 27. The diode 49 and the resistor 20 provide a frame of reference for the voltage drop across the emitter of the transistor 7 in relation to the regulated /stabilized/ voltage, thus offering the measurement linearity as required.

With the selector switch 1 set to measure the contact-breaker closing angle, the transistor 7 base becomes connected—via the resistor 15—to the stabilizer 2, its emitter being connected to the diodes 48 and 47 to whose junction the rheostat 31 is connected, and—via the resistor 18—to the contact-breaker of the engine under the test. With the breaker contacts in closed condition, current is allowed to pass through the emitter of transistor 7 as determined by the voltage drop across the resistor 31. When the breaker contacts open, the resistor 31 is energized with the supply voltage reduced by its drop across the resistor 18 and the diode 47, but exceeding the stabilized voltage level, and hence there is no current in the emitter of transistor 7. The average value of the current through the transistor 7 is conclusive for the contact-breaker closing angle. The capacitor 37 with the resistor 18 form an integrating circuit for the pulse trains.

With the selector switch 1 set for testing high voltage across the contact-breaker capacitor, the emitter of transistor 7 becomes connected to the rheostat 26, while the resistor 15 is connected to the peak voltage measuring circuit. When the breaker contacts are thrown open, high voltage will be divided in the divider consisting of the resistors 19 and 16, and then rectified with the diode 46. Current through the resistor 26 will be proportional to the peak voltage. The Zener diode 43 is designed to limit the voltage, while the diodes 44 and 45 have to compensate for the voltage drop across the diode 46 and the base-emitter junction of transistor 7.

With the selector switch 1 set to measure the breaker contact resistance /to evaluate the contact surface condition/, the resistor 15 becomes connected to the potential divider consisting of the resistor 23 and the rheostat 32, which is series connected to the diode 50, the latter being designed to compensate for the voltage drop across the base-emitter junction of transistor 7. The transistor emitter is connected—via the resistor 22—to the contact-breaker of the engine being tested.

The voltage drop across the engine contact-breaker will be complemented to the reference value at the base of transistor 7, using the voltage drop across the resistor 22 as caused by the current through the emitter loop.

This current flowing through the transistor 7 emitter loop, is a measure of the breaker contacts surface condition.

The diodes 33 and 36, as well as the resistor 21, will restrict the voltage with the breaker contacts thrown open.

We claim:

1. Diagnostic apparatus for internal combustion, carburetor type engines, comprising: a meter 6, a probe 3, a stroboscope 5 and trigger 4, change-over switch means 1 for selecting the desired type of diagnosis operation, a transistor 7, the meter 6 being connected to the collector of the transistor 7, the emitter of the transistor 7 being connected to the switch means 1, a resistor 15 connecting the switch means 1 to the base of the transistor 7, a monostable element including transistors 8 and 9 having an output connected to said resistor 15, a resistor 17 in a circuit for testing peak voltage, rheostats 34,30,29,25,32,26,27 and 28 connected to said switch means, said switch means also being connected to the trigger 4 of the stroboscope 5, a stabilizer 2 connected to said switch means 1, a capacitor 24 connected to the base of transistor 8, a resistor 10 connecting the probe 3 to the base of transistor 8, a capacitor 35 connected to the base of transistor 8 such that the resistor 10 and the capacitors 24 and 35 form an integrator circuit, a resistor 14 connected to the base of transistor 9, the rheostats 29, 30 and 34 being connected in parallel to the resistor 14, a diode 46 connected in series with resistor 17, a resistor 16 and two diodes 44 and 45 connected in series with diode 46, two push-pull diodes 47, 48, the diode 48 being connected to the switch means 1, a resistor 18 connecting diode 47 to contact breaker points of the engine, a connector connecting the junction between resistor 17 and diode 46 and the junction between diodes 47 and 48, a capacitor 38 and rheostat 31 connected in series in said connector, a Zener diode having an output connected to the contact breaker points, and a resistor 19 connecting the input of the Zener diode to the junction between diode 46 and resistor 16.

2. The apparatus as claimed in claim 1 wherein in one of the positions of said switch means 1 the rheostat 25 is connected to the collector of transistor 9 and, through the emitter of transistor 7, to the resistor 15 while rheostat 26 is connected to the stabilizer 2, and the capacitor 41 is connected to the trigger 4.

3. The apparatus as claimed in claim 1 wherein in another of the positions of said switch means the resistor 15 is connected to the collector of transistor 9, and the emitter of transistor 7 is connected to the rheostat 25, while one of the rheostats 29 and 30 is connected to the stabilizer 2.

4. The apparatus as claimed in claim 1 wherein in another of the positions of said switch means the resistor 15 is connected to the rheostat 28, the emitter of transistor 7 is connected to the rheostat 27, and the latter is connected to the frame of reference consisting of diode 49 and rheostat 28, and in the next operating position of the switch means the resistor 15 is connected to the stabilizer 2 and the emitter of transistor 7 is connected to the diode 48, while in the next position of the switch means 1, the emitter of transistor 7 is connected to the resistor 17, and in the subsequent operating position of the switch means 1 the resistor 15 becomes connected to a potential divider, the latter consisting of resistor 23 and resistor 32, and connected in series with diode 50, the emitter of transistor 7 being connected via resistor 22 to the contact breaker points of the engine being tested.

* * * * *